US007657670B2

(12) United States Patent
Funamizu et al.

(10) Patent No.: US 7,657,670 B2
(45) Date of Patent: Feb. 2, 2010

(54) CONTROL APPARATUS SYSTEM

(75) Inventors: Yoshihiro Funamizu, Abiko (JP); Koji Doi, Yokohama (JP); Toshio Hayashi, Toride (JP); Satoru Kanno, Kashiwa (JP); Mitsushige Murata, Yokohama (JP); Akihito Mori, Toride (JP); Kunio Tsuruno, Tokyo (JP)

(73) Assignee: Canon Kabushiki Kaisha (JP)

( * ) Notice: Subject to any disclaimer, the term of this patent is extended or adjusted under 35 U.S.C. 154(b) by 688 days.

(21) Appl. No.: 11/448,145

(22) Filed: Jun. 6, 2006

(65) Prior Publication Data

US 2006/0291886 A1 Dec. 28, 2006

(30) Foreign Application Priority Data

Jun. 8, 2005 (JP) ............................ 2005-168448

(51) Int. Cl.
*G06F 3/00* (2006.01)
*G06F 13/00* (2006.01)

(52) U.S. Cl. ............................ 710/38; 710/12; 710/20; 710/305; 710/316

(58) Field of Classification Search ............... 710/8–14, 710/305–317, 20–21, 36–38
See application file for complete search history.

(56) References Cited

U.S. PATENT DOCUMENTS

| | | | | |
|---|---|---|---|---|
| 3,792,447 | A * | 2/1974 | Beltz et al. | 710/21 |
| 5,499,341 | A * | 3/1996 | Wilson et al. | 710/21 |
| 6,915,380 | B2 * | 7/2005 | Tanaka et al. | 711/114 |
| 7,096,310 | B2 * | 8/2006 | Norden | 710/317 |
| 2002/0091898 | A1 * | 7/2002 | Matsunami et al. | 711/114 |
| 2003/0126296 | A1 * | 7/2003 | Aviles | 709/250 |
| 2004/0088444 | A1 * | 5/2004 | Baumer | 710/1 |
| 2005/0138258 | A1 * | 6/2005 | Seto | 710/301 |
| 2006/0095605 | A1 * | 5/2006 | Lee et al. | 710/36 |
| 2008/0222325 | A1 * | 9/2008 | Ishino et al. | 710/60 |

FOREIGN PATENT DOCUMENTS

| | | | |
|---|---|---|---|
| EP | 0065272 | A2 | 11/1982 |
| JP | 08-297436 | A | 11/1996 |

OTHER PUBLICATIONS

Extended European Search Report issued in European Patent application No. 06011260.4-2209/1731970 dated Feb. 27, 2009.

* cited by examiner

*Primary Examiner*—Christopher B Shin
(74) *Attorney, Agent, or Firm*—Rossi, Kimms & McDowell LLP

(57) ABSTRACT

A control apparatus system which enables reduction of costs and time for development. An image forming apparatus implementing the control apparatus system has an image output section including a plurality of functional units having different functions. The image output section has an ASIC that is provided in each of the functional units, for performing signal processing on an input signal thereto, a communication IC provided in each of the functional units, and a relay board that performs interface matching between each of the functional units and at least one driver circuit board.

18 Claims, 12 Drawing Sheets

CONTROL APPARATUS SYSTEM

BACKGROUND OF THE INVENTION

1. Field of the Invention

The present invention relates to a control apparatus system, and more particularly, to an image forming apparatus and accessories therefor.

2. Description of the Related Art

As image forming apparatuses, there have been known LBPs (laser beam printers) and copying machines using electrophotography, and the copying machines each have sheet conveying devices, such as a paper deck, a finisher, and a stacker, connected thereto, as accessories. Conventionally, there has been proposed an image forming apparatus and accessories of this type (a control apparatus system, in a more broadly encompassing term), in which a main control section incorporating a CPU is provided so that the main control section can control the overall operation of the system in a centralized manner. In this case, the main control section directly drives units dispersedly disposed in the control apparatus system. For example, even when a motor drive unit is disposed at a location away from the main control section, the main control section generates a motor drive signal and transmits the drive signal to the motor drive unit through wiring, whereby a motor within the motor drive unit is driven by the drive signal.

Further, there has conventionally been proposed an image forming apparatus incorporating a plurality of CPUs (see e.g. Japanese Laid-Open Patent Publication (Kokai) No. H08-297436). More specifically, in the proposed image forming apparatus, the components of the image forming apparatus are classified into a plurality of units each forming a single control unit, on a function-by-function basis, and each of the units is provided with a CPU for controlling a controlled object in the unit. The units perform multiplex communication therebetween. The CPUs of the respective units each control a controlled object in the unit concerned while keeping consistency in control between the units. This configuration makes it possible to reduce the number of connecting wires other than connecting wires necessary for multiplex communication. Further, the configuration makes it possible to dispense with the provision of a main control section for controlling the overall operation of the image forming apparatus (the control apparatus system, in a more broadly encompassing term).

However, if the image forming apparatus disclosed in Japanese Laid-Open Patent Publication (Kokai) No. H08-297436 is to be redesigned, since controlled objects (loads) and control specifications are generally not the same as those in original designing or previous designing, it is difficult to develop a new apparatus by making use of the configuration of the old apparatus. For this reason, whenever the apparatus is to be redesigned, the development of an apparatus configuration optimum for the configuration of a device as a controlled object, and in particular, the development of an electric circuit board of the device needs to be carried out.

Even if the configuration of an old apparatus can be made use of, portions that can be utilized are generally limited to a limited few of a plurality of circuit blocks forming the electric circuit board of the apparatus.

Therefore, whenever an apparatus is designed or redesigned, costs and time for development are required, which results in an increase in the manufacturing costs of the apparatus and hinders reduction of time for development.

SUMMARY OF THE INVENTION

It is an object of the present invention to provide a control apparatus system which enables reduction of costs and time for development.

To attain the above object, the present invention provides a control apparatus system including a plurality of units having different functions, comprising signal processing devices provided in respective ones of the units, for each performing signal processing on an input signal thereto, communication devices provided in respective ones of the units, and a matching unit that performs interface matching between each of the plurality of units and at least one other unit.

According to the present invention, the functional units of the control apparatus system are interconnected through a common interface, which facilitates functional unit-by-functional unit development or utilization of an old functional unit. Therefore, it is possible to improve efficiency in developing the apparatus and reduce the total development cost of the apparatus.

More specifically, since the matching unit is provided that performs interface matching between the functional units, sharing or utilization of a functional unit or the matching unit in a plurality of types of control apparatus systems can be facilitated.

Preferably, each of the units has at least one load device, and the signal processing device of each of the units generates a drive signal for driving the load device, based on the input signal.

Preferably, the matching unit is provided between a specific unit that is one of the units and at least one of the other units, for performing interface matching between the specific unit and the at least one of the other units.

More preferably, each of the signal processing devices of at least two of the units other than the specific unit has an input interface circuit, and the matching unit has at least two output interface circuits, each of the at least two output interface circuits of the matching unit being connected to an associated one of the input interface circuits of the at least two units.

Further preferably, the at least two output interface circuits of the matching unit are connected for serial communication with the respective input interface circuits of the at least two units.

Even more preferably, each of the signal processing devices of the at least two units has a serial-to-parallel conversion circuit connected to the input interface circuit, and at least one output interface circuit connected to the serial-to-parallel conversion circuit.

Further preferably, the matching unit comprises a signal input-and-output section for receiving and delivering signals from and to the specific unit, a signal switching section provided between the signal input-and-output section and the at least two output interface circuits of the matching unit, and a switching control section for controlling operation of the signal switching section.

Even more preferably, the switching control section is a central processing unit.

Preferably, the matching unit is a central processing unit that is capable of executing a program associated with at least one of the units.

Further preferably, each of the units is provided with at least one load device and a central processing unit that controls the at least one load device.

Preferably, the matching unit includes a storage device for storing control information associated with the units, and performs interface matching between each of the units and the at least one other unit based on the control information.

Preferably, each of the units includes a storage device for storing identification information indicative of the unit, and the matching unit performs interface matching between each of the units and the at least one other unit based on the identification information.

Preferably, serial communication is performed between at least two of the units and the matching unit.

Preferably, parallel communication is performed between at least two of the units and the matching unit.

Preferably, analog communication is performed between at least two of the units and the matching unit.

Preferably, the control apparatus system is an image forming apparatus.

Preferably, the control apparatus system is an accessory apparatus connected to an image forming apparatus.

Preferably, the matching unit is provided in at least one of the units.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described in detail below with reference to the drawings showing a preferred embodiment thereof.

Figure 2:
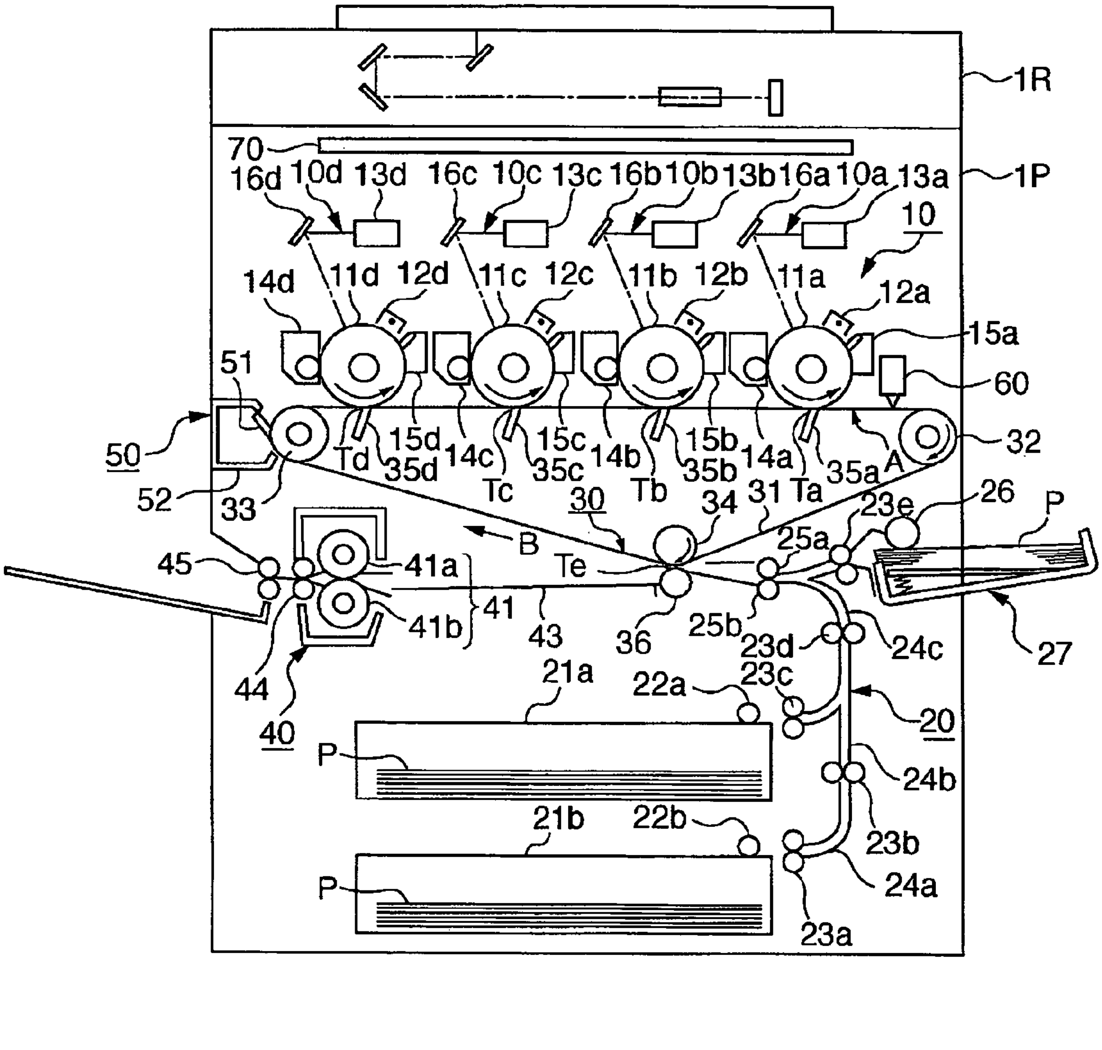
FIG. 2 is a cross-sectional view of essential parts of the image forming apparatus.

FIG. 2 is a cross-sectional view of essential parts of an image forming apparatus implementing a control apparatus system according to an embodiment of the present invention.

The image forming apparatus according to the present embodiment, which employs electrophotography, is comprised of an image reader 1R and an image output section 1P. The image reader 1R reads in an original image, and the image output section 1P forms an image on a transfer material P based on information on the original image from the image reader 1R. The image output section 1P outputs a color image by employing the intermediate transfer method, and four image-forming stations associated with respective four basic colors are arranged parallel with each other to form the image forming section. First, a description will be given of the image reader 1R with reference to FIGS. 3 and 4.

Figure 3:
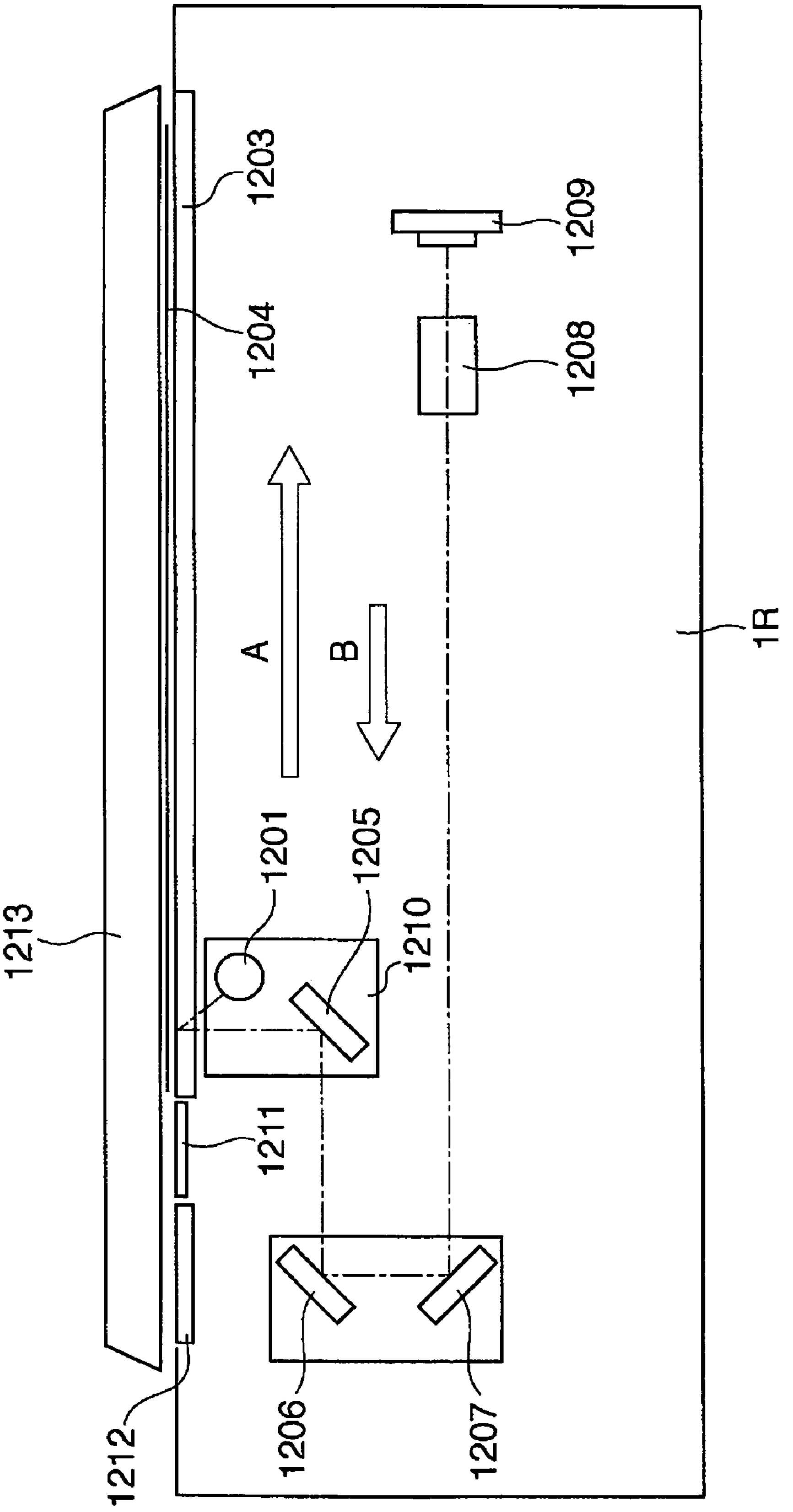
FIG. 3 is a schematic cross-sectional view of an image reader of the image forming apparatus.

FIG. 3 is a schematic cross-sectional view of the image reader 1R.

An original 1204 placed on an original platen glass 1203 is illuminated by an original illuminating lamp 1201, and an image of the original 1204 is formed on a color CCD 1209 via a first mirror 1205, a second mirror 1206, a third mirror 1207, and a lens 1208. The color CCD 1209 is comprised of a plurality of image pickup elements arranged side by side in a main scanning direction, for reading one main scanning line of an image of the original 1204. A reader section 1210 provided with the original illuminating lamp 1201 and the first mirror 1205 sequentially reads line images while moving in a direction indicated by the arrow A appearing in FIG. 3. In doing this, a drive system, not shown, drives the second mirror 1206 and the third mirror 1207 such that they are also moved in the direction indicated by the arrow A while holding constant the distance (optical path length) between a surface of the original 1204 and the color CCD 1209.

Now, a description will be given of a sequence in which an image on the original 1204 is read by the image reader 1R.

When an operator inputs an original reading command (e.g. by depressing a copy button), the image reader 1R causes a drive system, not shown, to move the reader section 1210 from a position in FIG. 3 (hereinafter referred to as "the home position") in a direction indicated by the arrow B in FIG. 3. As a consequence, the reader section 1210 is moved to a position immediately below the shading correction plate 1211. Then, the image reader 1R turns on the original illuminating lamp 1201 to illuminate the shading correction plate 1211, thereby guiding a line image from the shading correction plate 1211 to the color CCD 1209 via the first mirror 1205, the second mirror 1206, the third mirror 1207, and the lens 1208.

The pixel-by-pixel output signals (each corresponding to one image pickup element) of the line image read from the shading correction plate 1211 by the color CCD 1209 are subjected to shading correction by an image processing circuit, not shown, and associated shading correction values are generated such that the output levels of all the pixels become equal to a predetermined level. These correction values are applied to the read data of the original 1204 to thereby correct uneven illuminance of the original illuminating lamp 1201, reduced light quantity on the periphery of the lens 1208, and pixel-by-pixel variations in sensitivity of the color CCD 1209, whereby uneven image reading of an original is corrected. When generation of the shading correction values is completed, the reader section 1210 is driven by the drive system, not shown, to further move in the direction indicated by the arrow B in FIG. 3 to a position immediately below the moving original reading window 1212. The moving original reading window 1212 will be described in detail hereinafter.

The position immediately below the moving original reading window 1212 is the start position for reading an original image. The drive system, not shown, causes the reader section 1210 to move acceleratedly from the start position in the direction indicated by the arrow A in FIG. 3. Thereafter, the reader section 1210 is moved at a predetermined constant speed before the reader section 1210 reaches a position just below the leading end (left end, as viewed in FIG. 3) of the original 1204 which is pressed by a presser plate 1213 such that flatness thereof is maintained.

When the reading position of the reader section 1210 reaches the position just below the leading end of the original 1204, the color CCD 1209 starts an operation for sequentially reading the original 1204 on a one line image-by-one line image basis.

Even after the reader section 1210 has reached the position just below the leading end of the original 1204, the drive system, not shown, moves the reader section 1210 at the constant speed in the direction indicated by the arrow A in FIG. 3. Then, when the reader section 1210 reaches the trailing end of the original 1204 (the right end of the same, as viewed in FIG. 3), the drive system stops driving the reader section 1210. Thereafter, the drive system moves the same in the direction indicated by the arrow B in FIG. 3 to the position shown in FIG. 3, i.e., to its home position. When the reader section 1210 returns to its home position, the image reader 1R terminates the sequential image reading processing, and enters a standby state for next reading processing.

Thus, the basic image reading operation of the image reader 1R is completed.

The image reader 1R configured as above can have an automatic document feeder (ADF) mounted thereon. The ADF is equipped with a function of automatically feeding a large number of originals in succession, so that the use of the ADF makes it possible to save the trouble of replacing originals one by one, thereby reducing copying time. In the following, a description will be given of a reading operation performed by the image reader 1R provided with an ADF.

Figure 4:
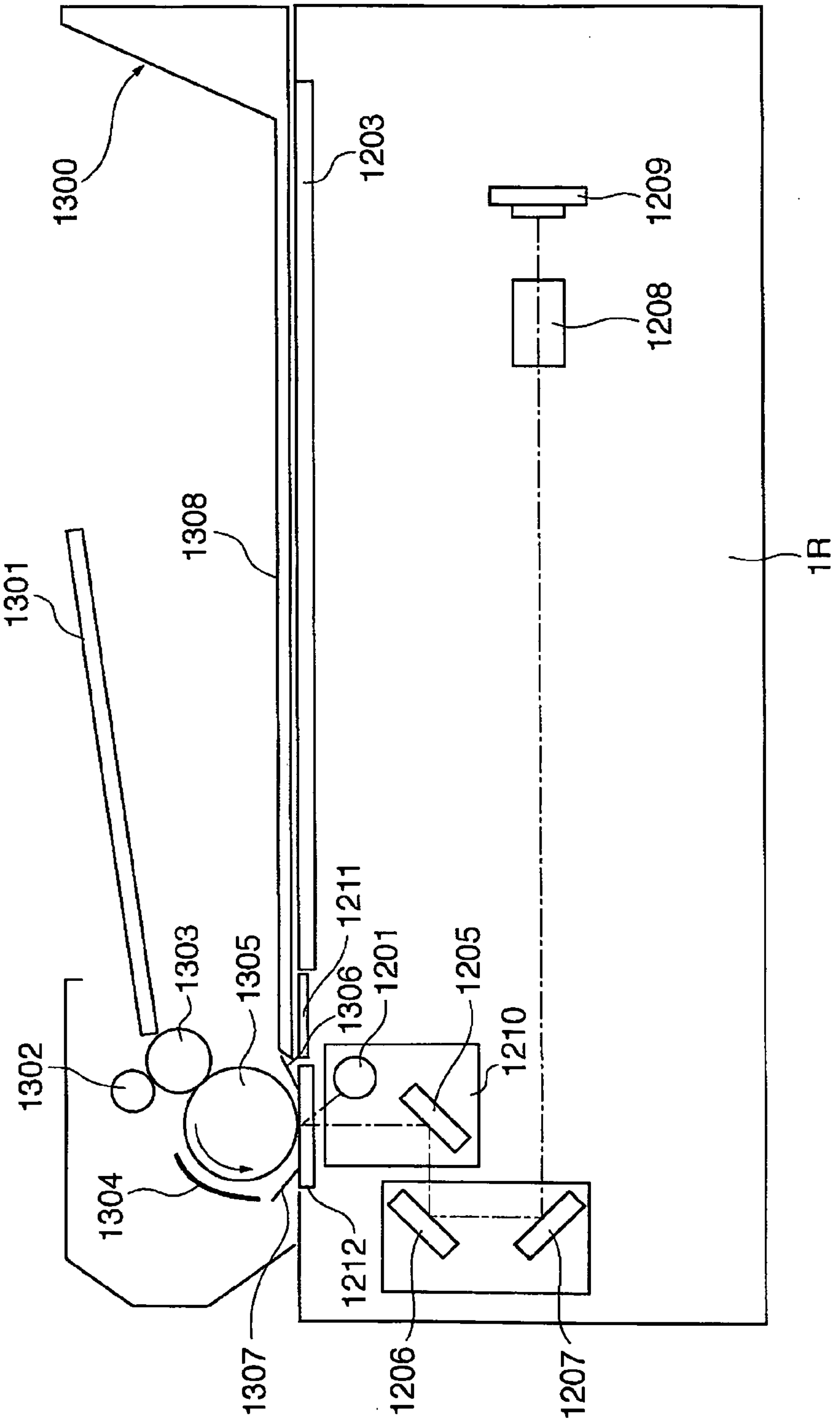
FIG. 4 is a schematic cross-sectional view of an image reader provided with an ADF.

FIG. 4 is a schematic cross-sectional view of the image reader 1R provided with the ADF.

In the image reader R shown in FIG. 4, the ADF 1300 is mounted in place of the presser plate 1213 appearing in FIG. 3.

In the image reader 1R, when the operator inputs an original reading command in a state where the reader section 1210 is at its home position (i.e., its position shown in FIG. 3), the drive system, not shown, and the image processing circuit, not shown, generate the aforementioned shading correction values. Then, the drive system moves the associated movable components to respective positions shown in FIG. 4, and fixedly positions the reader section 1210. In this state, the reader section 1210 is positioned just below the moving original reading window 1212, and a conveying roller 1305 of the ADF 1300 is positioned on the moving original reading window 1212.

Normally, a plurality of originals are placed on a feed tray 1301 of the ADF 1300. When the original reading operation is started, the originals are fed one by one by feed rollers 1302 and 1303, conveyed by a conveying roller 1305, which performs rotation in a direction indicated by the arrow in FIG. 4, through a slit formed between guides 1304, 1307, and 1306, and the conveying roller 1305, and discharged onto a discharge tray 1308.

The rotational speed of the conveying roller 1305 is determined according to a reading magnification. An image on each original conveyed by the conveying roller 1305 is read through the moving original reading window 1212 by the reader section 1210.

As described above, image data of original images read by the image reader 1R constructed as shown in FIG. 3 or 4 are sequentially delivered to the image output section 1P. The image output section 1P forms images based on the delivered image data.

Referring again to FIG. 2, the image output section 1P is comprised of the image forming section 10, a sheet feeder unit 20, an intermediate transfer unit 30, a fixing unit 40, and a control section 80 (not shown in FIG. 2).

The image forming section 10 has the four stations 10*a*, 10*b*, 10*c*, and 10*d* juxtaposed with one another. The stations 10*a* to 10*d* are identical in construction to one another. In the respective four stations 10*a*, 10*b*, 10*c*, and 10*d*, photosensitive drums 11*a*, 11*b*, 11*c*, and 11*d* as image carriers are each rotatably supported at the center thereof and driven to perform rotation in a direction indicated by the arrow A in FIG. 2. Primary electrostatic chargers 12*a*, 12*b*, 12*c*, and 12*d*, exposure sections 13*a*, 13*b*, 13*c*, and 13*d* of an optical system, turning-back mirrors 16*a*, 16*b*, 16*c*, and 16*d*, and developing devices 14*a*, 14*b*, 14*c*, and 14*d* are disposed in facing relation to the outer peripheral surfaces of the associated ones of the photosensitive drums 11*a* to 11*d*. The primary electrostatic charger, the exposure section, the turning-back mirror, and the developing section are arranged in the direction of rotation of the photosensitive drum in the mentioned order.

The primary electrostatic chargers 12*a* to 12*d* apply a uniform amount of electric charge to the surfaces of the respective photosensitive drums 11*a* to 11*d*. Then, light beams, such as laser beams, modulated in accordance with an image signal to be recorded are applied by the exposure sections 13*a* to 13*d* to the respective photosensitive drums 11*a* to 11*d* via the respective turning-back mirrors 16*a* to 16*d*, whereby an electrostatic latent image is formed on each of the photosensitive drums 11*a* to 11*d*.

The developing devices 14*a*, 14*b*, 14*c*, and 14*d* contain respective developers (hereinafter referred to as "toners") of four colors, i.e., yellow, cyan, magenta, and black, and the electrostatic latent images on the respective photosensitive drums 11*a* to 11*d* are visualized by the respective developing devices 14*a* to 14*d*. The visualized images (developed images) are sequentially transferred onto an intermediate transfer belt 31 of the intermediate transfer unit 30 in respective image transfer areas Td, Tc, Tb, and Ta.

Cleaning devices 15*a*, 15*b*, 15*c*, and 15*d* are disposed downstream of the respective image transfer areas Ta to Td in the direction of rotation of the photosensitive drums. The cleaning devices 15*a*, 15*b*, 15*c*, and 15*d* clean the surfaces of the respective photosensitive drums 11*a* to 11*d* by scraping off toners left on the photosensitive drums 11*a* to 11*d* without being transferred onto the intermediate transfer belt 31.

The images of the respective toners are sequentially formed by the above described process.

The sheet feeder unit 20 is comprised of cassettes 21*a* and 21*b*, a manual feed tray 27, pickup rollers 22*a*, 22*b*, and 26, feed roller pairs 23*a* to 23*e*, feed guides 24*a* to 24*c*, and registration rollers 25*a* and 25*b*. The cassettes 21*a* and 21*b* and the manual feed tray 27 contain transfer materials P, and the pickup rollers 22*a*, 22*b*, and 26 feed transfer materials P one by one from the cassettes 21*a* and 21*b* and the manual feed tray 27, respectively. The feed roller pairs 23*a* to 23*e* and the feed guides 24*a* to 24*c* convey the transfer materials P fed by the pickup rollers 22*a*, 22*b*, and 26 to the registration rollers 25*a* and 25*b*. The registration rollers 25*a* and 25*b* convey the transfer materials P to a secondary transfer area Te in timing synchronous with image formation in the image forming section 10.

Now, a detailed description will be given of the intermediate transfer unit 30.

The intermediate transfer belt 31 is wound around a drive roller 32 for driving the intermediate transfer belt 31, a driven roller 33 driven by rotation of the intermediate transfer belt 31, and a counter roller 34 opposed to the secondary transfer area Te via the intermediate transfer belt 31. A primary transfer plane A is formed between the drive roller 32 and the driven roller 33. The drive roller 32 is formed by a metal roller coated with a rubber (urethane rubber or chloroprene rubber) layer having a thickness of several millimeters, so as to prevent a slip between the intermediate transfer belt 31 and the drive roller 32 itself. The drive roller 32 is driven by a pulse motor, not shown, to perform rotation in a direction indicated by the arrow B in FIG. 2.

The primary transfer plane A of the intermediate transfer belt 31 extends in facing relation to the stations 10*a* to 10*d* of the image forming section 10 such that the photosensitive drums 11*a* to 11*d* face the primary transfer plane A. Thus, the primary image transfer areas Ta to Td are arranged on the primary transfer plane A. In the primary image transfer areas Ta to Td, primary-transfer electrostatic chargers 35*a* to 35*d* are disposed so as to be opposed to the respective photosensitive drums 11*a* to 11*d* via the intermediate transfer belt 31.

A secondary transfer roller 36 which is opposed to the counter roller 34 forms the secondary transfer area Te by a nip between the intermediate transfer belt 31 and the secondary transfer roller 36 itself. The secondary transfer roller 36 is pressed against the intermediate transfer belt 31 under moderate pressure. Further, at a location downstream of the secondary transfer area Te on the intermediate transfer belt 31, there are provided a cleaning blade 51 for cleaning the image forming surface of the intermediate transfer belt 31, and a waste toner box 52 for receiving waste toner.

The fixing unit 40 includes a fixing roller 41*a*, a roller 41*b*, a guide 43, and an inner sheet discharge roller pair 44 and an outer sheet discharge roller pair 45. The fixing roller 41*a* contains a heat source, such as a halogen heater. The roller 41*b* is pressed against the fixing roller 41*a*. The roller 41*b* as well may be provided with a heat source. The guide 43 guides a transfer material P into a nip part of the fixing roller pair 41 formed by the fixing roller 41*a* and the roller 41*b*. The inner sheet discharge roller pair 44 and the outer sheet discharge roller pair 45 further guide the transfer material P discharged from the fixing roller pair 41, to the outside of the apparatus.

A registration sensor 60 for detecting misregistration is provided on the primary transfer plane A at a location downstream of all the stations 10 *a* to 10*d* of the image forming section 10 and upstream of the drive roller 32. This registration sensor 60 is used to correct mechanical mounting errors between the photosensitive drums 11*a* to 11*d* and shift in registration, i.e., color displacement (misregistration) in the color images formed on the respective photosensitive drums 11*a* to 11*d*. The misregistration occurs due to optical path length errors between laser beams generated by the respective exposure sections 13*a* to 13*d*, variations in optical path, and warpage of the transfer material P caused by the ambient temperature of an LED (light-emitting diode).

As described in detail hereinafter with reference to FIG. 1, the control section 80 forming the image output section 1P includes a CPU 101 for controlling the operations of mechanisms within the above described units, and a driver board 200. When an image forming operation start signal is transmitted from the control section 80, supply of transfer materials P from one of the cassettes 21*a* and 21*b* and the tray 27 selected according to the size or the like of the selected transfer materials P is started.

First, in response to the image forming operation start signal transmitted from the control section 80, transfer materials P are fed one by one e.g. by the pickup roller 22*a* from the cassette 21*a*. Then, each transfer material P is conveyed to the registration rollers 25*a* and 25*b* while being guided by the feed roller pairs 23*c* and 23*d* along a conveying path formed by the feed guides 24*b* and 24*c*. At this time, the registration rollers 25*a* and 25*b* are stopped from rotating, and hence the leading end of the transfer material P abuts against the nip part between the registration rollers 25*a* and 25*b*. Thereafter, the registration rollers 25*a* and 25*b* start rotation in timing synchronous with start of image formation by the stations 10*a* to 10*d* of the image forming section 10. Timing for the start of rotation of the registration rollers 25*a* and 25*b* thereafter is set such that the transfer material P and a toner image primarily transferred from the image forming section 10 onto the intermediate transfer belt 31 meet each other in the secondary transfer area Te.

On the other hand, in the image forming section 10, when the image forming operation start signal is transmitted from the control section 80, a toner image (developed image) formed on the most upstream photosensitive drum 11*d*, as viewed in the direction of rotation of the intermediate transfer belt 31, is primary-transferred onto the intermediate transfer belt 31 in the primary transfer area Td by the primary-transfer electrostatic charger 35*d* to which a high voltage is applied.

The toner image primary-transferred onto the intermediate transfer belt 31 is conveyed to the next primary transfer area Tc. In the station 10*c* of the image forming section 10, image formation is performed in timing delayed by a time period required for conveyance of the toner image from the primary transfer area Td to the primary transfer area Tc, and in the primary transfer area Tc, the next toner image is transferred onto the preceding image transferred in the primary transfer area Td, in aligned registration therewith (with image positions aligned). Further, a similar operation is carried out in each of the primary transfer areas Tb and Ta for the other colors, and after all, the toner images in the respective four colors are primarily transferred onto the intermediate transfer belt 31.

Thereafter, when the transfer material P enters the secondary transfer area Te and comes into contact with the intermediate transfer belt 31, a high voltage is applied to the secondary transfer roller 36 in timing synchronous with passage of the transfer material P. Then, the toner images in the respective four colors, which are formed on the intermediate transfer belt 31 by the above-described process, are collectively transferred onto the surface of the transfer material P. Thereafter, the transfer material P is accurately guided by the transfer guide 43 to the nip part of the fixing roller pair 41, and the toner image is fixed to the surface of the transfer material P by the heat of the fixing roller pair 41 and the pressure of the nip part. Then, the transfer material P is conveyed by the inner and outer discharge roller pairs 44 and 45 to be discharged out of the apparatus.

Figure 1:
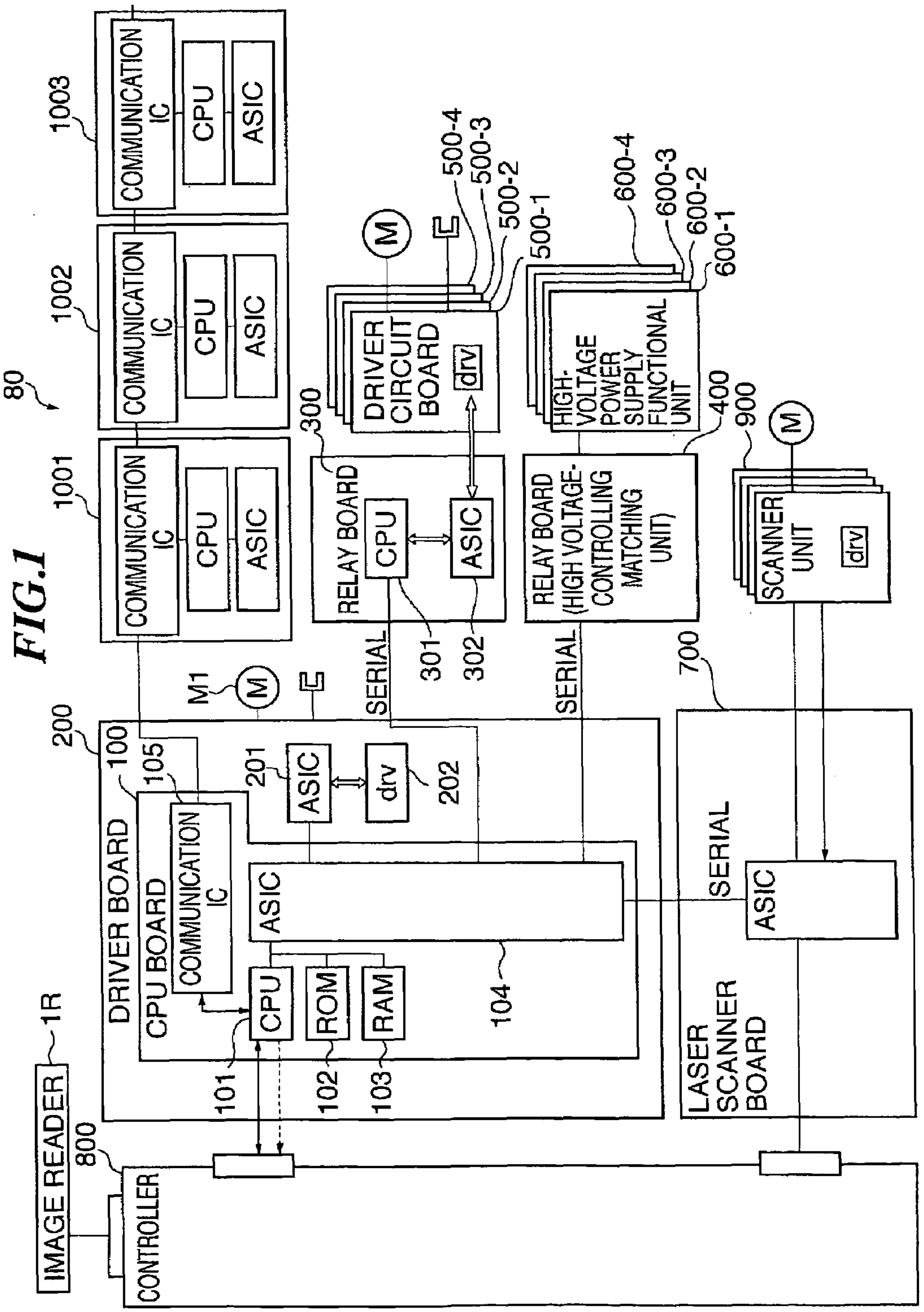
FIG. 1 is a block diagram of a plurality of functional units forming an image output section of an image forming apparatus according to an embodiment of the present invention.

FIG. 1 is a block diagram showing a plurality of functional units forming the image output section 1P.

In FIG. 1, there are shown a plurality of functional units of the image output section 1P into which the components of the image output section 1P are classified, and the functional units (boards) are each formed as a single control unit. Each of the units is comprised of at least one load device and a control section for controlling the load device, as described in detail hereinafter. The control section has a signal processing device for performing signal processing on input signals supplied to the associated unit. Based on the input signals, the signal processing device generates a drive signal for driving the associated load device.

It should be noted that not only the components of the image output section 1P, but also the other components of the image forming apparatus shown in FIG. 2 may be classified into a plurality of function-specific units, and each unit may be formed as a single control unit.

Referring to FIG, 1, reference numeral 100 designates a CPU board as a control section of a specific unit which is one of the units. This CPU board 100 is comprised of a CPU 101, a ROM 102, a RAM 103, an ASIC (Application Specific Integrated Circuit) 104, and a communication IC 105. Reference numeral 200 designates a driver board for driving DC loads. The driver board 200 is comprised of the CPU board 100, and an ASIC 201 and a driver 202. The driver 202 drives a motor M1. The ASIC 104 on the CPU board 100 and the ASIC 201 on the driver board 200 perform high-speed serial communication therebetween. Alternatively, serial communication may be performed between the CPU 101 on the CPU board 100 and the ASIC 201 on the driver board 200.

A relay board 300 and driver circuit boards (driver units) 500-1 to 500-4 are connected to the ASIC 104 on the CPU board 100.

Figure 5:
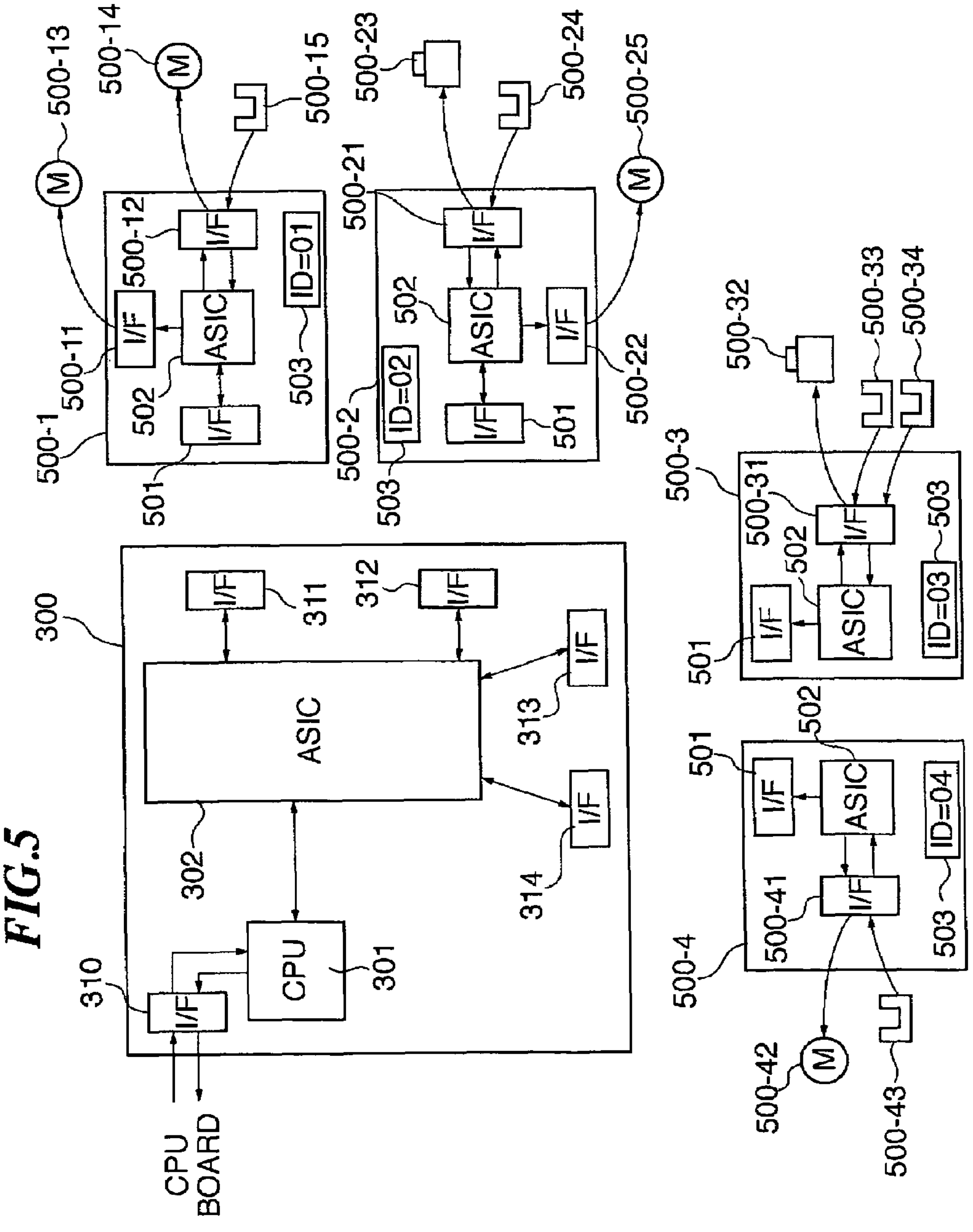
FIG. 5 is a block diagram of a relay board and driver circuit boards in a control section of the image output section.

FIG. 5 is a block diagram of the relay board 300 and the driver circuit boards 500-1 to 500-4.

The relay board 300 is a matching unit to which a plurality of different driver circuit boards can be connected. More specifically, the relay board 300 performs interface matching between the CPU board (specific unit) 100 and the driver circuit boards 500-1 to 500-4. In order to execute fine control (interface matching) according to the properties of the driver circuit boards 500-1 to 500-4, the relay board 300 has a storage device storing control information associated with the driver circuit boards 500-1 to 500-4, and performs control based on the control information.

The driver circuit boards 500-1 to 500-4 are control sections of the respective functional units of the image output section 1P. In the present embodiment, in which the image output section 1P is divided into four functional units, the driver circuit board 500-1 is provided for controlling the function of a sheet feeder section, the driver circuit board 500-2 for controlling that of a sheet conveying section, the driver circuit board 500-3 for controlling that of a double-sided conveying section, and the driver circuit board 500-4 for controlling that of a sheet discharging section. The image output section 1P or the image forming apparatus has other functional units, but description thereof is omitted for simplicity.

First, a description will be given of the relay board 300.

Referring to FIG. 5, an I/F section 310 is a connector for connection to the CPU board (specific unit) 100. The CPU 301 of the relay board 300 is serially connected with the CPU board 100 via the I/F section 310. The CPU 301 is a so-called one-chip CPU incorporating a ROM and a RAM, and exchanges commands with the CPU board 100, thereby performing load control in response to each command.

An ASIC 302 is connected to the CPU 301 via a CPU bus. The ASIC 302 generates I/F signals to be delivered to the respective driver circuit boards 500-1 to 500-4. The I/F signals generated by the ASIC 302 drive loads connected to the driver circuit boards 500-1 to 500-4, respectively. The I/F signals are serially output to I/F connectors 311, 312, 313, and 314. In short, the ASIC 302 cooperates with the CPU 301 and the I/F section 310 to function as the aforementioned signal processing device.

Next, the driver circuit board 500-1 will be described as a representative of the driver circuit boards 500-1 to 500-4.

Referring to FIG. 5, the driver circuit board 500-1 is connected to the I/F connector 311 of the relay board 300 via an I/F connector 501. An ASIC 502 is connected to the I/F connector 501, and I/F connectors 500-11 and 500-12 are connected to the ASIC 502. The ASIC 502 converts a serial I/F signal delivered from the relay board 300 into a parallel I/F signal, and outputs the parallel I/F signal to the I/F connectors 500-11 and 500-12. Further, the ASIC 502 converts a parallel I/F signal delivered from each of the I/F connectors 500-11 and 500-12 into a serial I/F signal, and outputs the serial I/F signal to the relay board 300. The I/F connectors 311, 501, 500-11, and 500-12 function as an input/output interface circuit.

Further, the driver circuit board 500-1 is provided with an ID setting section 503. An ID (e.g. “01”) for identifying the driver circuit board 500-1 is set in advance in the ID setting section 503, and the ID setting section 503 sends this ID to the relay board 300 via the ASIC 502. The ID setting section 503 is formed e.g. by a 4-bit DIP switch.

It should be noted that each of the I/F connector 501, the ASIC 502, and the ID setting section 503 is identically configured in the four driver circuit boards 500-1 to 500-4.

A stepper motor 500-13 is connected to the I/F connector 500-11, and a stepper motor 500-14 and a sensor 500-15 are connected to the I/F connector 500-12.

Next, a description will be given of the flow of signals in the driver circuit board 500-1.

Figure 6:
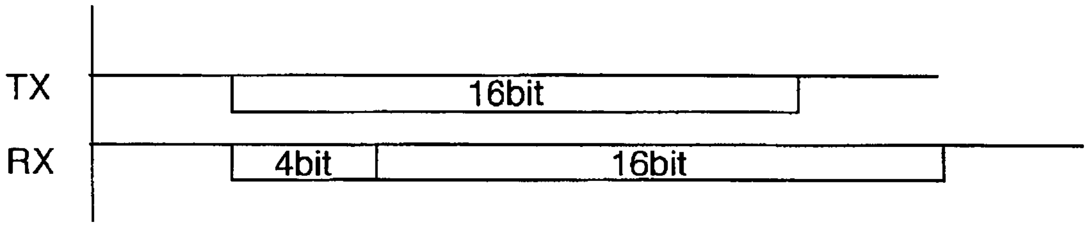
FIG. 6 is a diagram useful in explaining the forms of serial I/F signals transmitted and received between the relay board and the driver circuit board.

FIG. 6 is a diagram useful in explaining the forms of the respective serial I/F signals transmitted and received between the relay board 300 and the driver circuit board 500-1.

The signal which is delivered from the relay board 300 to the driver circuit board 500-1 is a 16-bit serial signal. This signal is referred to as the Tx signal. On the other hand, the signal which is delivered from the driver circuit board 500-1 to the relay board 300 is a 20-bit serial signal. This signal is referred to as the Rx signal.

The driver circuit board 500-1 converts the received Tx signal into a 16-bit parallel signal. This signal conversion will be described with reference to FIG. 7.

Figure 7:
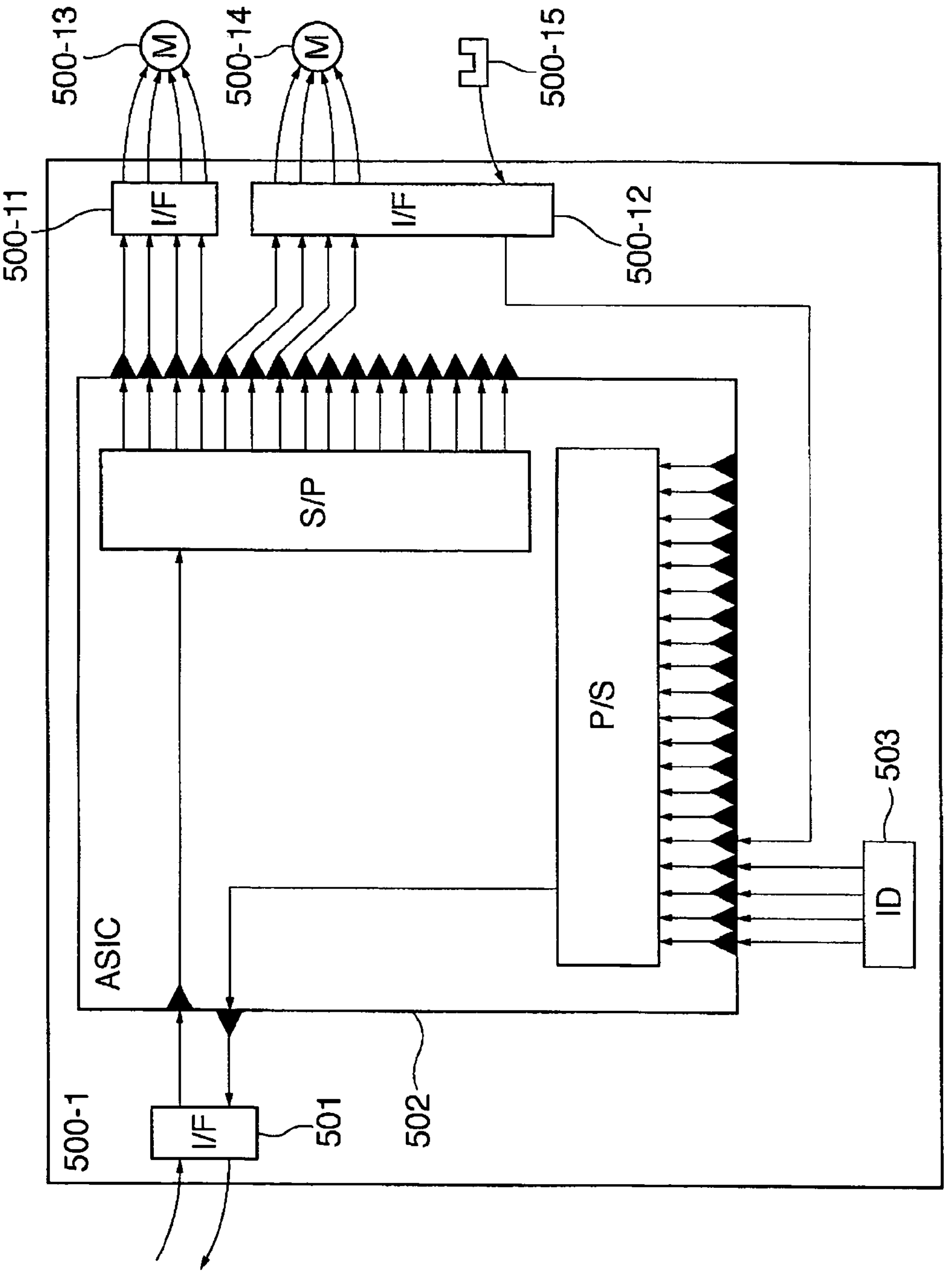
FIG. 7 is a diagram of a signal conversion system in the driver circuit board.

FIG. 7 is a diagram showing a signal conversion system in the driver circuit board 500-1.

The ASIC 502 converts the 16-bit parallel signal Tx into a parallel signal, and assigns four bits (i.e., the twelfth to fifteenth bits) of the parallel signal to a phase signal of the stepper motor 500-13 and another four bits (i.e., the eighth to eleventh bits) of the parallel signal to a phase signal of the stepper motor 500-14. The remaining eight bits (i.e., the zeroth to seventh bits) of the parallel signal are spared.

As for the 20-bit parallel signal, the ID signal from the ID setting section 503 is assigned to four bits (i.e., the sixteenth to nineteenth bits) of the parallel signal, and an output signal from the sensor 500-15 is assigned to one bit (i.e., the fifteenth bit) of the parallel signal. The remaining fifteen bits (i.e., the zeroth to fourteenth bits) of the parallel signal are spared. The parallel signal is converted into a serial signal, and the serial signal is sent as the Rx signal to the relay board 300.

Thus, interfacing between the relay board 300 and the driver circuit board 500-1 is realized. The driver circuit boards 500-2, 500-3, and 500-4 are different from the driver circuit board 500-1 in the loads connected thereto and the ID set in the ID setting section 503. However, the driver circuit boards 500-2, 500-3, and 500-4 are identical in the principle to the driver circuit board 500-1, and hence description thereof is omitted.

Next, a detailed description will be given of an operation performed by the relay board 300 in response to a command from the CPU board (specific unit) 100, for driving the driver circuit board 500-1.

First, in communication immediately after turn-on of the power, the ASIC 502 converts the ID (01) set in the ID setting section 503 of the driver circuit board 500-1 into the serial Rx signal and sends the serial Rx signal to the relay board 300. By receiving this signal, the relay board 300 can detect that a unit connected to the I/F connector 311 is the driver circuit board 500-1 associated with the feeder function.

When another unit is connected to the I/F connector 311, the communication channel is switched by detecting the connection of the unit, whereby proper interface control can be performed. More specifically, each of the I/F connectors 311 to 314 of the relay board 300 is configured such that any of the driver circuit boards (units) can be connected thereto, and the relay board 300 is capable of performing interface control corresponding to a connected driver circuit board by detecting the ID of the driver circuit board.

Next, a description will be given of exemplary operations performed by the relay board 300 in response to a "sheet feeding" command from the CPU board (specific unit) 100.

The CPU 301 on the relay board 300 stores a program for controlling operations of e.g. the motors 500-13 and 500-14 connected to the driver circuit board (unit) 500-1. This program enables the relay board 300 to deliver a proper drive signal to the motor 500-13 or 500-14 in proper timing. The drive signal is output from the I/F connector 311 in serial form, and input to the ASIC 502 via the I/F connector 501 on the driver circuit board 500-1. The ASIC 502 subjects the serial drive signal to serial-to-parallel conversion to drive the stepper motor 500-13 or 500-14 via the associated one of the I/F connectors 500-11 and 500-12.

A detection signal from the sensor 500-15 that detects sheet-conveying timing in the sheet-feeding operation is input to the ASIC 502 via the I/F connector 500-12. The ASIC 502 subjects the detection signal from the sensor 500-15 to parallel-to-serial conversion, and then transfers the resulting serial signal to the relay board 300 via the I/F connector 501. Thus, the relay board 300 is notified of the sheet-conveying timing in the sheet-feeding operation.

By the way, when the stepper motor 500-13 or 500-14 connected to the driver circuit 500-1 is replaced by another kind of motor, such as a DC motor, for example, fine adjustment is required e.g. for optimizing the drive of the motor. In the present embodiment, it is possible to carry out the fine adjustment simply by changing the program to be executed by the CPU 301 on the relay board 300 and changing the hardware of the driver circuit board 500-1. In other words, it is not required to change the hardware of the relay board 300 or the CPU board 100, for example. This applies to a case where the number of sensors is increased as a result of a change in the configuration of the sheet feeder unit.

Similarly, when the number of driver circuit boards is increased as a result of a change in the configuration of the image output section IP, it is enough to simply increase the number of I/F connectors on the relay board 300 and to change the program to be executed by the CPU 301. In short, since neither hardware nor software of the CPU board (specific unit) 100 controlling the overall operation of the image output section 1P is required to be changed at all, it is possible to enhance the versatility of the CPU board 100.

It should be noted that the relay board 300 may be configured to arbitrarily set the connection relation of the signals between the CPU board 100 and the driver circuit boards 500-1 to 500-4. A relay board 300A configured to enable the optional configuration will be described below with reference to FIG. 8.

Figure 8:
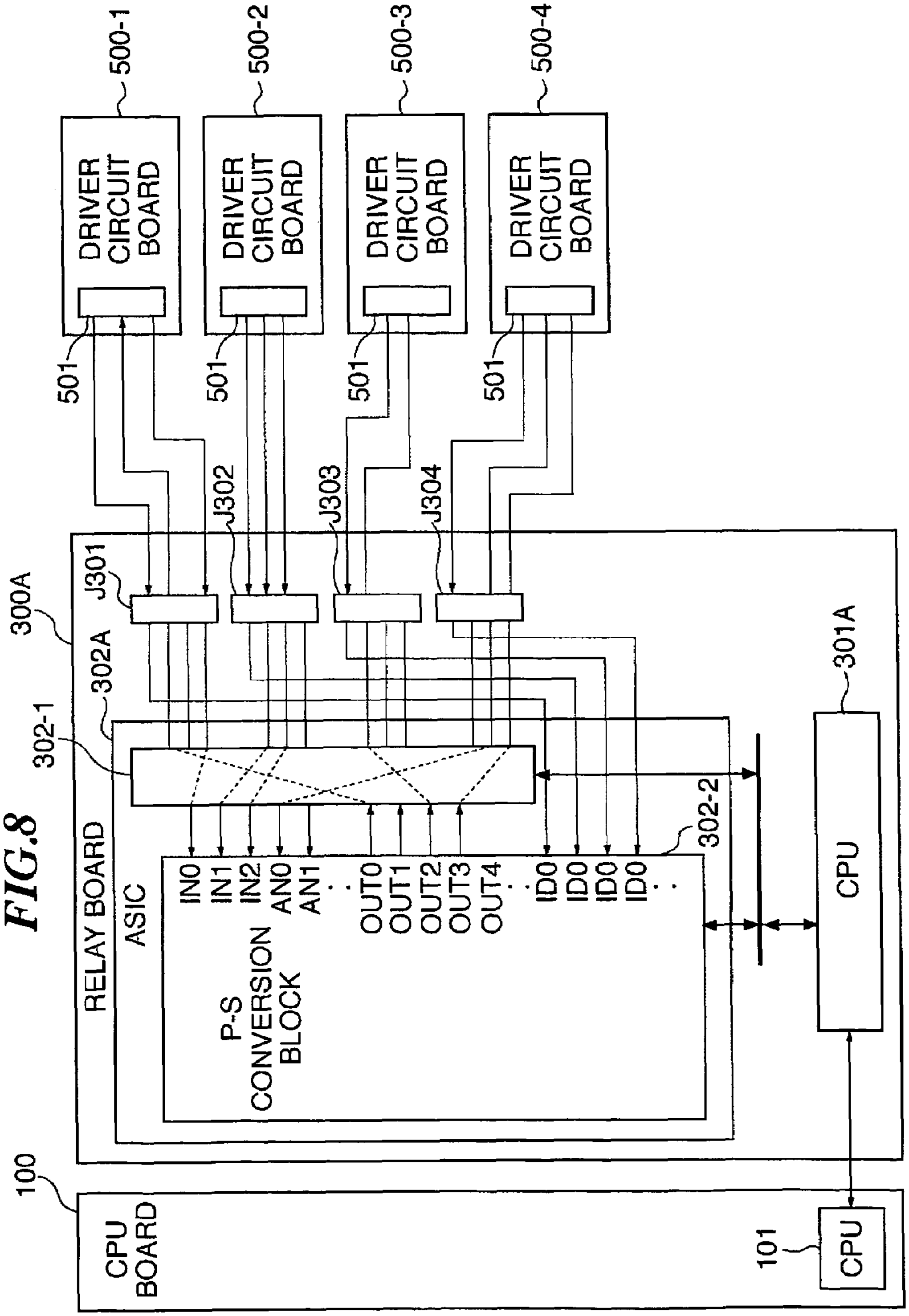
FIG. 8 is a block diagram of the internal circuit configuration of the relay board capable of switching signal paths between a CPU board and the driver circuit boards.

FIG. 8 is a block diagram of the internal circuit configuration of the relay board configured to be capable of switching signal paths between the CPU board 100 and the driver circuit boards 500-1 to 500-4. The same components as those in FIGS. 1 and 5 are designated by the same reference numerals, and description thereof is omitted.

The relay board 300A is provided with a CPU 301A, an ASIC 302A, and I/F connectors J301 to J304. The ASIC 302A is provided with a connection/connection-changing block 302-1 as a signal switching section for performing signal connection or changing the signal connection in response to an instruction from the CPU 301A. Further, the ASIC 302A is provided with a P-S conversion block 302-2 that converts a serial signal input from the CPU board (specific unit) 100 into a parallel signal and converts a parallel signal input from the driver circuit board 500-1 into a serial signal. The P-S conversion block 302-2 functions as a signal input-and-output section that inputs and outputs signals to and from the specific unit. The P-S conversion block 302-2 also receives ID signals from the respective driver circuit boards 500-1 to 500-4.

For example, the driver circuit board 500-1 is connected to the I/F connector J301 on the relay board 300A via the I/F connector 501.

Each of the ID signals of the respective driver circuit boards 500-1 to 500-4 is sent to a first pin of an associated one of the I/F connectors J301, J302, J303, and J304 on the relay board 300A. Then, the ID signals are sent to respective ID0 terminals of the P-S conversion block 302-2. The CPU 301A on the relay board 300A identifies the driver circuit boards connected to the respective I/F connectors J301, J302, J303, and J304, based on the ID signals sent to the respective ID0 terminals of the P-S conversion block 302-2. Then, the CPU 301A controls the connection/connection-changing block 302-1 based on the results of the identification, such that each signal input to the connection/connection-changing block 302-1 is output to a destination associated with an associated one of the driver circuit boards connected to the respective I/F connectors J301, J302, J303, and J304. In short, the CPU 301A functions as a switching control section that controls the operation of the signal switching section.

For example, when I/F signals output e.g. from the driver circuit board 500-4 include an analog signal, the CPU 301A controls the connection/connection-changing block 302-1 such that the analog signal is delivered to an analog terminal AN0 of the P-S conversion block 302-2. Thus, even when input and output signals mixedly include digital signals and analog signals, the connection/connection-changing block 302-1 is capable of programmably connecting the input/output signals to proper terminals, respectively, or changing the destinations of input/output signals, as required.

Next, a description will be given of a relay board 400 as a matching unit for high voltage control, appearing in FIG. 1, and high-voltage power supply functional units (driver circuit boards) 600-1 to 600-4 connected to the relay board 400.

Figure 9:
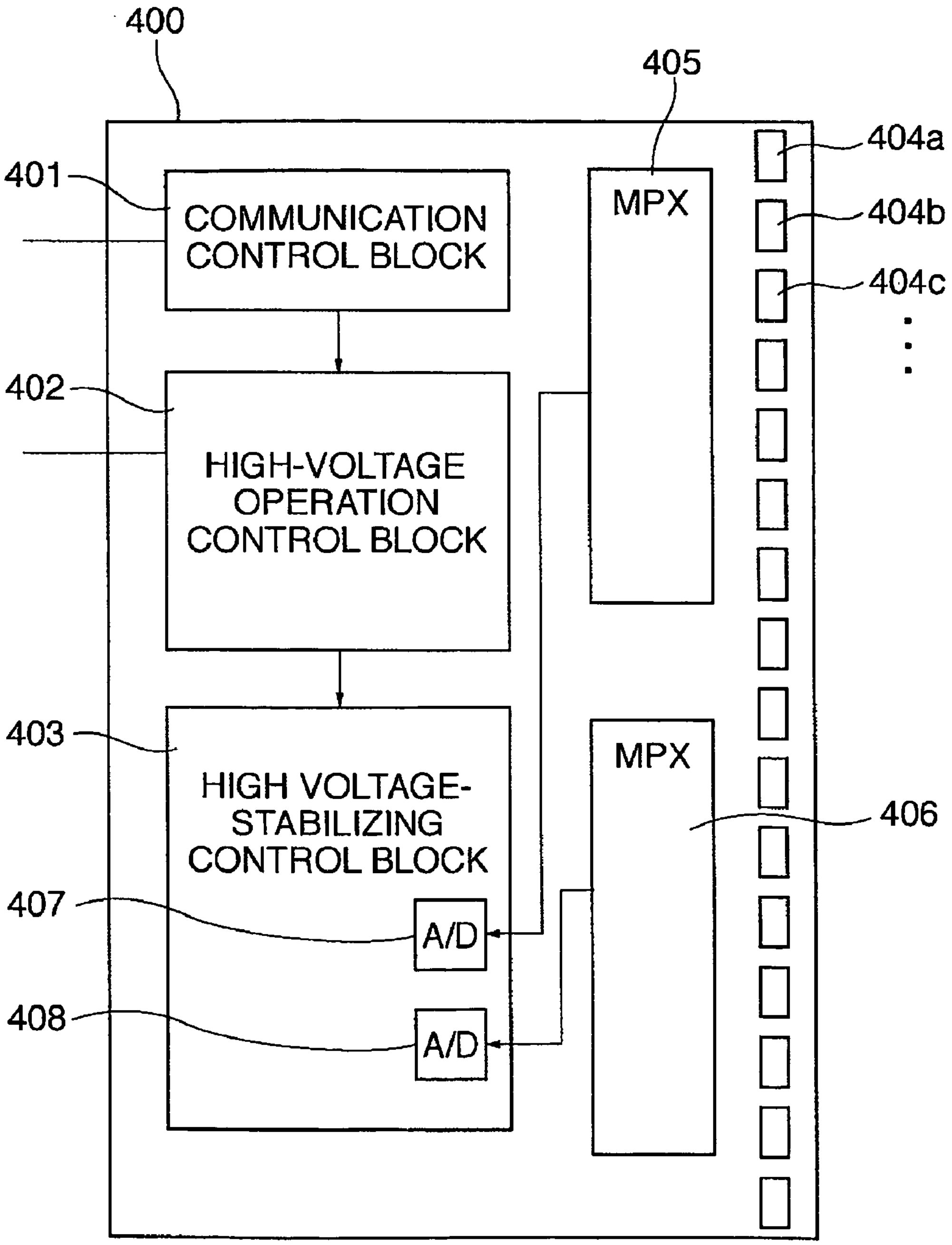
FIG. 9 is a block diagram of the internal configuration of the relay board as a high voltage-controlling matching unit.

FIG. 9 is a block diagram of the relay board 400 as a high voltage-controlling matching unit.

Referring to FIG. 9, reference numeral 401 designates a communication control block that performs communication with the CPU board (specific unit) 100. Reference numeral 402 designates a high-voltage operation control block formed by a CPU or the like. The high-voltage operation control block 402 receives an instruction from the CPU board 100 via the communication control block 401. Then, the high-voltage operation control block 402 sequentially controls the operations of the respective high-voltage power supply functional units 600-1 to 600-4 connected to the high voltage-controlling matching unit (relay board) 400. Reference numeral 403 designates a high voltage-stabilizing control block that performs stabilization control of output signals from the respective high-voltage power supply functional units 600-1 to 600-4 in response to sequential instructions from the high-voltage operation control block 402. Reference numerals 404*a*, 404*b*, 404*c*, . . . designate connectors. These connectors are identical in construction and function to one another. Different high-voltage power supply functional units are connected to the respective connectors 404*a*, 404*b*, 404*c*, . . . in a one-to-one relationship. Reference numerals 405 and 406 designate multiplexers (MPXs) each connected to the connectors 404*a*, 404*b*, 404*c*, . . . Each of the multiplexers 405 and 406 selects a desired signal from analog signals input from the connectors and outputs the selected signal to the high voltage-stabilizing control block 403. Reference numerals 407 and 408 designate A/D converters connected to the respective multiplexers 405 and 406. Each of the A/D converters 407 and 408 converts an analog signal output from the associated one of the multiplexers 405 and 406 into a digital signal.

In the following, a description will be given of the operation of the high voltage-controlling matching unit (relay board) 400 configured as above.

First, the communication control block 401 receives mode information containing information on a color mode, a print magnification, a print sheet size, etc. from the CPU board (specific unit) 100 controlling the overall operation of the image output section IP, and transfers the mode information to the high-voltage operation control block 402. When receiving the mode information and a printing start signal, the high-voltage operation control block 402 sequentially issues instructions to the high voltage-stabilizing control block 403. More specifically, by issuing the instructions to the high voltage-stabilizing control block 403, the high-voltage operation control block 402 causes associated ones of the high-voltage power supply functional units to perform mode control based on the received mode information.

The high voltage-stabilizing control block 403 causes the multiplexers 405 and 406 to switch signals to be selected, in a time-sharing manner. Then, the high voltage-stabilizing control block 403 acquires a digital value indicative of the level of an analog voltage signal from each of the high-voltage power supply functional units 600-1 to 600-4 via the A/D converter 407 or 408. The high voltage-stabilizing control block 403 compares the digital value indicative of the voltage signal level with a setting value determined based on the mode information, and delivers driving information for output control to an associated one of the high-voltage power supply functional units.

The control operation by the high voltage-stabilizing control block 403, i.e., the series of operations from switching of a signal to be selected by each of the multiplexers, through acquisition of a digital value indicative of a voltage signal level, to delivery of driving information is repeatedly carried out for each of the high-voltage power supply functional units at predetermined time intervals. Thus, the high-voltage signals output from the respective high-voltage power supply functional units 600-1 to 600-4 to the image output section 1P are controlled to a predetermined output level. Further, the high-voltage power supply functional units 600-1 to 600-4 are each controlled based on the mode information from the CPU board 100 such that an output operation following a predetermined image forming process is performed, whereby desired image formation is carried out in the image output section IP.

Next, one of the high-voltage power supply functional units 600-1 to 600-4 used for the image forming process will be described with reference to FIG. 10.

Figure 10:
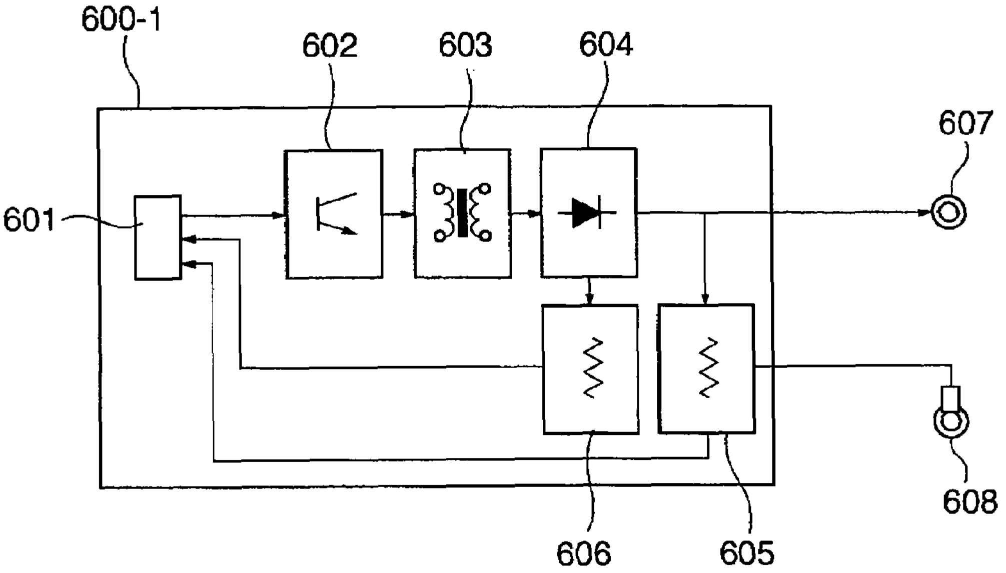
FIG. 10 is a block diagram of a high-voltage power supply functional unit.

FIG. 10 is a block diagram of the high-voltage power supply functional unit 600-1. The high-voltage power supply functional units 600-2 to 600-4 are basically identical in configuration to the high-voltage power supply functional unit 600-1, and therefore the following description will be given of only the high-voltage power supply functional unit 600-1 as a representative.

In the high-voltage power supply functional unit 600-1, reference numeral 601 designates a connector for high-voltage driver, which is used for connecting the high-voltage power supply functional unit 600-1 to the high voltage-controlling matching unit 400. Reference numeral 602 designates a driving block. The driving block 602 performs a switching operation based on driving information delivered from the high voltage-controlling matching unit 400 via the high-voltage driver connector 601 in the form of a PWM (Pulse Width Modulation) signal or the like. Reference numeral 603 designates a transformer block mainly comprised of a transformer. The transformer block 603 amplifies a driving signal (AC voltage) generated by the driving block 602. Reference numeral 604 designates a signal-smoothing block. The signal-smoothing block 604 smoothes the driving signal (AC voltage) amplified by the transformer block 603 into a high-voltage direct current of a predetermined polarity, and outputs the obtained high-voltage direct current to an output terminal 607. Reference numeral 608 designates a ground terminal forming a return path of a high-voltage direct current that is output to a load from the output terminal 607.

Reference numeral 605 designates a voltage-detecting block. The voltage-detecting block 605 detects a voltage value indicative of the high-voltage direct current that is output to the output terminal 607 from the signal-smoothing block 604, and sends the detected voltage value to the high voltage-controlling matching unit 400. Reference numeral 606 designates a current-detecting block. The current-detecting block 606 detects the current value of the high-voltage direct current output to the load from the output terminal 607, and sends the detected current value to the high voltage-controlling matching unit 400.

In the following, a description will be given of the operation of the high-voltage power supply functional unit 600-1 configured as above.

When driving information e.g. in the form of the PWM signal is delivered from the high voltage-controlling matching unit 400 to the driving block 602 via the high-voltage driver connector 601, the driving block 602 performs a switching operation based on the driving information and generates the driving signal for obtaining a desired amount of electric power. In response to the driving signal, the transformer block 603 outputs a high AC voltage. The signal-smoothing block 604 rectifies this high AC voltage to a high-voltage direct current of a predetermined polarity and outputs the high-voltage direct current to the output terminal 607.

The voltage of the high-voltage direct current output from the signal-smoothing block 604 to the output terminal 607 is divided by the voltage-detecting block 605 to a voltage level enabling the A/D converter 407 or 408 of the high voltage-controlling matching unit 400 to perform conversion to a digital value. Then, the divided voltage is delivered to the high voltage-controlling matching unit 400 via the high-voltage driver connector 601. On the other hand, the high-voltage direct current output to the load from the output terminal 607 flows into the ground terminal 608, followed by being returned through the current-detecting block 606 to the signal-smoothing block 604 and the transformer block 603. At this time, the current-detecting block 606 detects the current value of this load current and delivers the detected current value to the high voltage-controlling matching unit 400 via the high-voltage driver connector 601.

This enables the high voltage-controlling matching unit 400 to control the output voltage and the output current from the high-voltage power supply functional unit 600-1 to respective desired values based on the detected values of the output voltage and the output current.

It should be noted that the high voltage-controlling matching unit 400 can control the levels of the output voltages and the output currents from the respective high-voltage power supply functional units 600-1 to 600-4 in a time-sharing manner by causing the multiplexer 405 or 406 to operate.

Next, three examples of the control form in each of accessories (decks) 1001 to 1003 in the case where the decks 1001 to 1003 are mounted to the image forming apparatus shown in FIG. 2 will be described with reference to FIGS. 11 to 13. The control forms in the respective decks 1001 to 1003 are basically identical to each other, and hence in FIGS. 11 to 13, the deck 1001 is illustrated as a representative.

Figure 11:
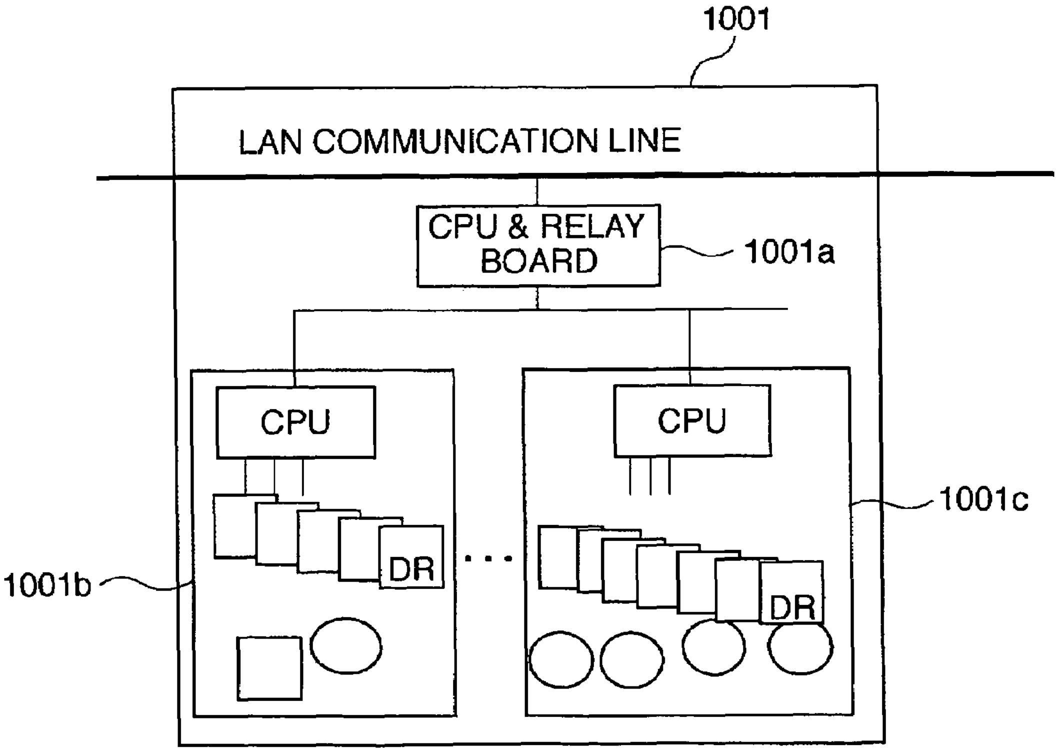
FIG. 11 is a block diagram of a first control form of a deck as an accessory of the image forming apparatus.

FIG. 11 is a block diagram of a first control form of the deck 1001.

The deck 1001 incorporates a plurality of sheet feeder units 1001*b* and 1001*c*, and each of the sheet feeder units 1001*b* and 1001*c* has a single CPU, a plurality of driver circuit boards, and load devices connected to the respective driver circuit boards. Further, in the first control form, the deck 1001 is connected to the CPU board 100 of the image output section 1P by a LAN communication line, and in the deck 1001, a single CPU and relay board (hereinafter referred to as "the CPU/relay board) 1001*a* is connected between the LAN communication line and the sheet feeder units 1001*b* and 1001*c*.

With this configuration, the CPU board 100 is required to communicate not with the CPUs in the respective sheet feeder units 1001*b* and 1001*c*, but only with a single CPU on the CPU/relay board 1001*a*, so that load applied to the CPU board 100 can be reduced. It should be noted that what is limited in the first control form is the configuration in which the deck 1001 is provided with a plurality of CPUs, but not a form of communication between the CPUs.

Figure 12:
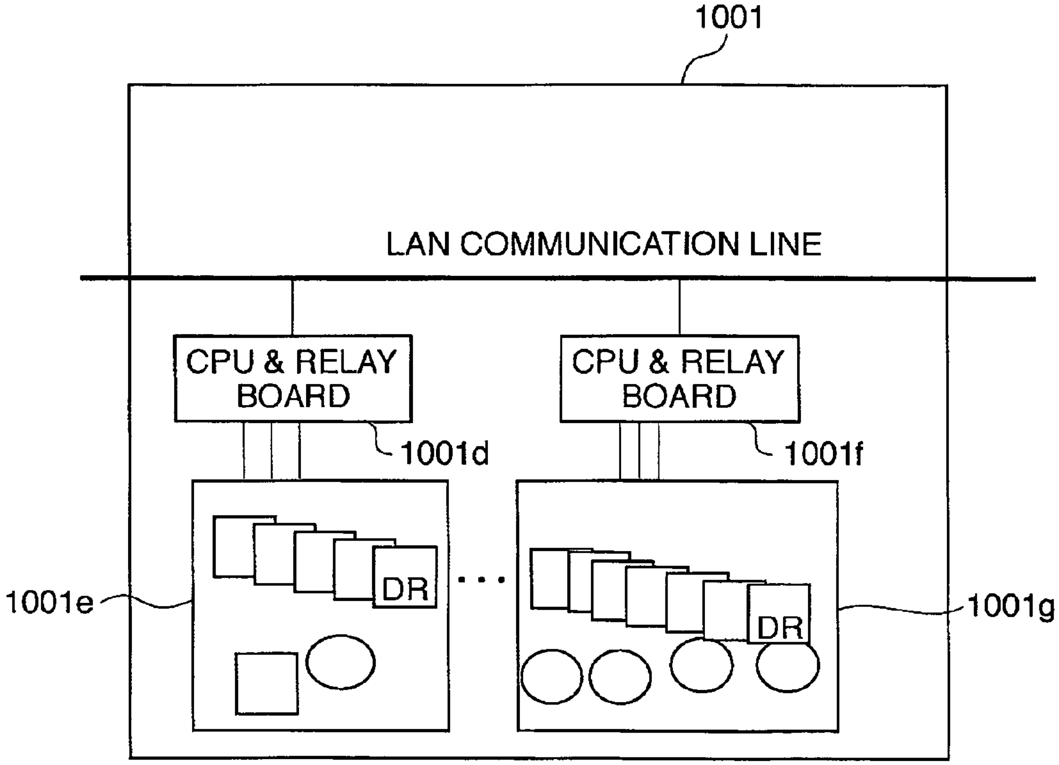
FIG. 12 is a block diagram of a second control form of the deck.

FIG. 12 is a block diagram of a second control form of the deck 1001.

In the second control form, the deck 1001 incorporates a plurality of sheet feeder units. One of the sheet feeder units has a CPU/relay board 1001*d* that is a matching unit, and a driver load section 1001*e* comprised of a plurality of driver circuit boards and load devices connected to the respective driver circuit boards. Another sheet feeder unit has a CPU/relay board 1001*f*, and a driver load section 1001g comprised of a plurality of driver circuit boards and load devices connected to the respective driver circuit boards.

In the deck 1001 to which is applied the second control form, the CPU/relay board 1001*d* and the CPU/relay board 1001*f* are directly connected to the LAN communication line connecting between the deck 1001 and the CPU board 100 of the image output section IP. With this configuration, the second control form enables each of the CPUs on the respective CPU/relay boards 1001*d* and 1001*f* of the deck 1001 to directly communicate with the CPU board 100 of the image output section IP. Therefore, high-speed communication between the deck 1001 and the CPU board 100 of the image output section 1P can be achieved.

Figure 13:
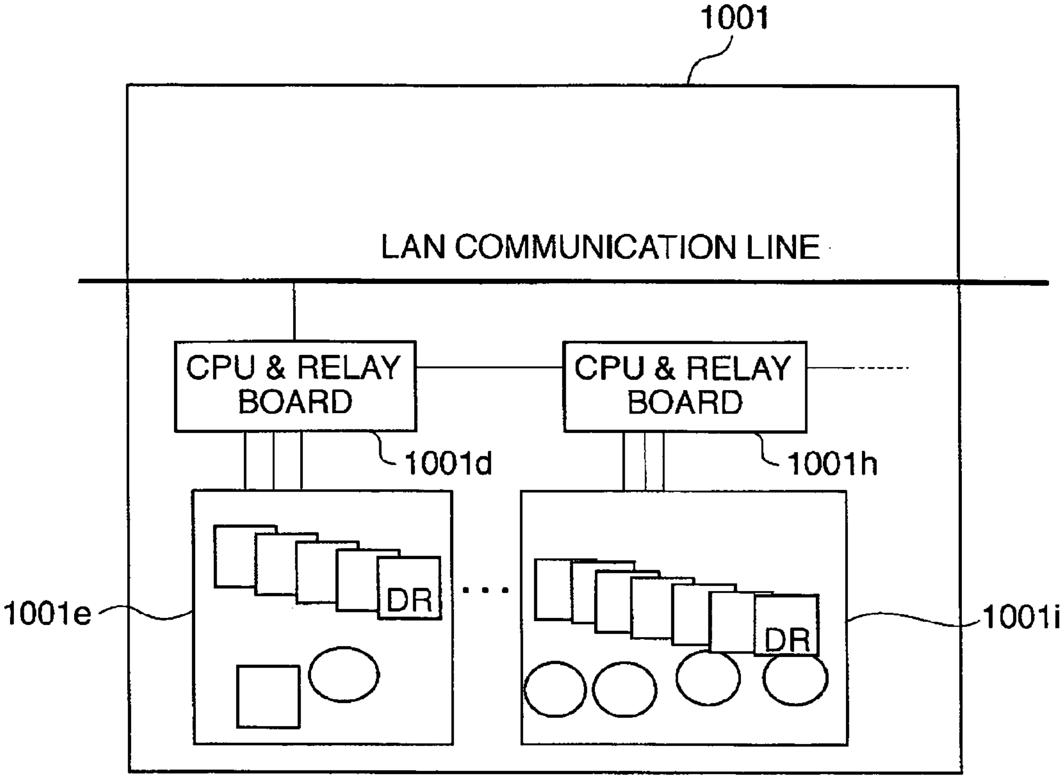
FIG. 13 is a block diagram illustrating a third control form of the deck.

FIG. 13 is a block diagram of a third control form of the deck 1001.

The third control form is basically the same as the second control form but differs therefrom in that another sheet feeder unit has a CPU/relay board 1001*h* and a driver load section 1001*i*, and the CPU/relay board 1001*h* is connected to the CPU/relay board 1001*d*. More specifically, only the CPU/relay board 1001*d* is connected to the LAN communication line connecting between the deck 1001 and the CPU board 100 of the image output section IP, and transfers information from the CPU board 100 of the image output section 1P to the CPU/relay board 1001*h*. It should be noted that the third control form does not employ the configuration in which the CPU connected to the LAN controls the other CPUs as in the first control form. Further, the third control form does not limit a method of communication between the CPUs.

The present image forming apparatus may be configured to execute only one of the above described first to third control forms, or alternatively configured such that any one of the control forms can be selectively executed and then switched to another as required.

Further, the present image forming apparatus may be configured such that the single CPU or each of the CPUs of the respective sheet feeder units connected to the CPU board 100 of the image output section 1P through the LAN determines whether to notify the image output section 1P of an error which has occurred in an associated sheet feeder unit or solve the error within the sheet feeder unit, and then selects one of the first to third control forms as required.

Although in the above control forms, the deck 1001 incorporates a plurality of sheet feeder units, the deck may incorporate a plurality of units equipped with another function.

It should be noted that although the present invention is also applied to the laser scanner board 700 and the scanner units 900 appearing in FIG. 1, description thereof is omitted. Further, a controller 800 has no direct relation to the present invention, and hence description thereof is also omitted.

This application claims the benefit of Japanese Patent Application No. 2005-168448 filed Jun. 8, 2005, which is hereby incorporated by reference herein in its entirety.

What is claimed is:

1. A control apparatus system including a plurality of driver units having different functions, comprising:

signal processing devices provided in respective ones of the driver units having different functions, each performing signal processing on an input signal thereto;

communication devices provided in respective ones of the driver units; and a matching unit that performs interface matching between (a) each of the plurality of driver units and (b) at least one functional unit different than the driver units, wherein each communication device is communicatively connected to the matching unit.

2. A control apparatus system as claimed in claim 1, wherein each of the driver units has at least one load device, and wherein said signal processing device of each of the driver units generates a drive signal for driving the load device, based on the respective input signal.

3. A control apparatus system as claimed in claim 1, wherein said matching unit is provided between a specific unit that is one of the driver units and at least one of the functional units, for performing interface matching between the specific unit and the at least one of the functional units.

4. A control apparatus system as claimed in claim 3, wherein of said signal processing devices of at least two of the driver units other than the specific unit has an input interface circuit, wherein said matching unit has at least two output interface circuits, and wherein each of said at least two output interface circuits of said matching unit is connected to an associated one of said input interface circuits of the at least two driver units.

5. A control apparatus system as claimed in claim 4, wherein said at least two output interface circuits of said matching unit are connected for serial communication with the respective input interface circuits of the at least two driver units.

6. A control apparatus system as claimed in claim 5, wherein each of said signal processing devices of the at least two driver units has a serial-to-parallel conversion circuit connected to said input interface circuit, and at least one output interface circuit connected to said serial-to-parallel conversion circuit.

7. A control apparatus system as claimed in claim 4, wherein said matching unit comprises a signal input-and-output section for receiving and delivering signals from and to the specific unit, a signal switching section provided between said signal input-and-output section and said at least two output interface circuits of said matching unit, and a switching control section for controlling operation of said signal switching section.

8. A control apparatus system as claimed in claim 7, wherein said switching control section is a central processing unit.

9. A control apparatus system as claimed in claim 1, wherein said matching unit is a central processing unit that is capable of executing a program associated with at least one of the driver units.

10. A control apparatus system as claimed in claim 3, wherein each of the driver units is provided with at least one load device and a central processing unit that controls the at least one load device.

11. A control apparatus system as claimed in claim 1, wherein said matching unit includes a storage device for storing control information associated with the driver units, and performs interface matching between each of the driver units and the at least one functional unit based on the control information.

12. A control apparatus system as claimed in claim 1, wherein each of the driver units includes a storage device for storing identification information indicative of the unit, and wherein said matching unit performs interface matching between each of the driver units and the at least one functional unit based on the identification information.

13. A control apparatus system as claimed in claim 1, wherein serial communication is performed between at least two of the driver units and said matching unit.

14. A control apparatus system as claimed in claim 1, wherein parallel communication is performed between at least two of the driver units and said matching unit.

15. A control apparatus system as claimed in claim 1, wherein analog communication is performed between at least two of the driver units and said matching unit.

16. A control apparatus system as claimed in claim 1, wherein the control apparatus system is an image forming apparatus.

17. A control apparatus system as claimed in claim 1, wherein the control apparatus system is an accessory apparatus connected to an image forming apparatus.

18. A control apparatus system as claimed in claim 1, wherein said matching unit is provided in at least one of the driver units.

* * * * *